US007404105B2

(12) United States Patent
Arai

(10) Patent No.: US 7,404,105 B2
(45) Date of Patent: Jul. 22, 2008

(54) HIGH AVAILABILITY MULTI-PROCESSOR SYSTEM

(75) Inventor: Susumu Arai, Kenmore, WA (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 10/919,105

(22) Filed: Aug. 16, 2004

(65) Prior Publication Data

US 2006/0036889 A1 Feb. 16, 2006

(51) Int. Cl.
*G06F 11/00* (2006.01)
(52) U.S. Cl. .......................................... 714/13; 714/10
(58) Field of Classification Search .................. 714/10, 714/13
See application file for complete search history.

(56) References Cited

U.S. PATENT DOCUMENTS

| 5,627,962 A | 5/1997 | Goodrum et al. .............. 714/13 |
| 5,903,717 A | 5/1999 | Wardrop ....................... 714/12 |
| 5,923,830 A | 7/1999 | Fuchs et al. ................... 714/11 |
| 6,141,770 A | 10/2000 | Fuchs et al. .................... 714/11 |
| 6,189,112 B1 | 2/2001 | Slegel et al. ................... 714/10 |
| 6,308,285 B1* | 10/2001 | Bowers ....................... 714/10 |
| 2005/0172164 A1* | 8/2005 | Fox et al. ....................... 714/13 |

FOREIGN PATENT DOCUMENTS

| EP | 0372578 | 6/1990 |
| WO | 8505707 | 5/1986 |

* cited by examiner

*Primary Examiner*—Michael C Maskulinski
(74) *Attorney, Agent, or Firm*—Lieberman & Brandsdorfer, LLC

(57) ABSTRACT

A method and system are provided for enabling replacement of a failed processor without requiring redundancy of hardware. The system is a multiprocessing computer system that includes one or more processor chips. Each processor chip may include one or more logical processors. During system initialization, one or more logical processors may be reserved in an inactive state. In the event an error is detected on a logical or physical processor, one or more reserved logical processors may have execution context transferred from the processor experiencing the error. Thereafter, the active processor is designated as inactive and replaced by the inactive processor to which the execution context has been transferred.

6 Claims, 7 Drawing Sheets

HIGH AVAILABILITY MULTI-PROCESSOR SYSTEM

BACKGROUND OF THE INVENTION

1. Technical Field

This invention relates to a method and system for reserving a processor in a multiprocessor system for availability of replacement in response to detection of an error in a non-reserved processor.

2. Description of the Prior Art

Recent processor chips contain multiple processors, with each processor on the chip known as a logical processor. In a multiprocessor system, a problem that sometimes occurs is that one of the processors on the chip fails, or the chip fails in its entirety. Various computer manufacturers have an interest in high availability systems that support recovery from a failure. Typically, these systems implement a hardware error recovery mechanism to automatically and transparently recover from most transient errors.

When a central processor in a multiprocessor system encounters an error, it is very desirable to not lose the work being done on that processor and to move that work to another processor that is still operating in the system. Several methods are known for solving this problem. For example, one known solutions is to move the architected state of the failed processor to an on-line processor in the system with the help of the operating system. However, since the mechanism uses the operating system to perform the function, the customer is aware that the incident occurred. U.S. Pat. No. 5,627,962 to Goodrum et al. proposes a hot spare boot circuit to automatically reassign the power up responsibilities of a second processor in the event the primary processor should fail. However, this solution is limited to failure in a processor at the time the processor is powered on and does not address a solution to a processor that fails during operation subsequent to powering on. Accordingly, the state of the art is limited to non-transparent solutions in the event of a failed processor.

There is therefore a need to provide a method and system for transparently reassigning responsibilities of a failed processor to a reserved processor without a modification to the operating system. The reserved processor is essentially hidden to the customer and is activated in response to an error in an active processor.

SUMMARY OF THE INVENTION

This invention comprises a method and system for providing high availability in a multiprocessing computer system.

In one aspect of the invention, a method is provided for reserving a first processor. Availability of the first processor is determined in response to detection of an error in a second processor. The first processor may be activated in response to availability of the first processor and detection of an error in the second processor.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A method and system is provided for providing high availability of processors without increasing hardware in the computer system. A physical processor chip is provided with one or more logical processors embedded therein. At least one or more of the logical processors in one or more processor chips in a multiprocessor system may be placed in an inactive state, i.e. reserved. In addition, each processor is identified in a table with an identifying integer and the status of the processor. If an error occurs in any of the active processors, one or more of the inactive processors may be used to replace the active processor affected by the error. The process of replacing an active processor with an inactive processor includes transferring the execution context. However, the process of replacing an active processor does not require any additional hardware and does not require the system to be shut-down. Accordingly, based upon the design of a processor chip, a logical processor within the chip may be reserved as a replacement processor in the event of an error in any active processor in a multiprocessor computing system.

Technical Background

Figure 1:
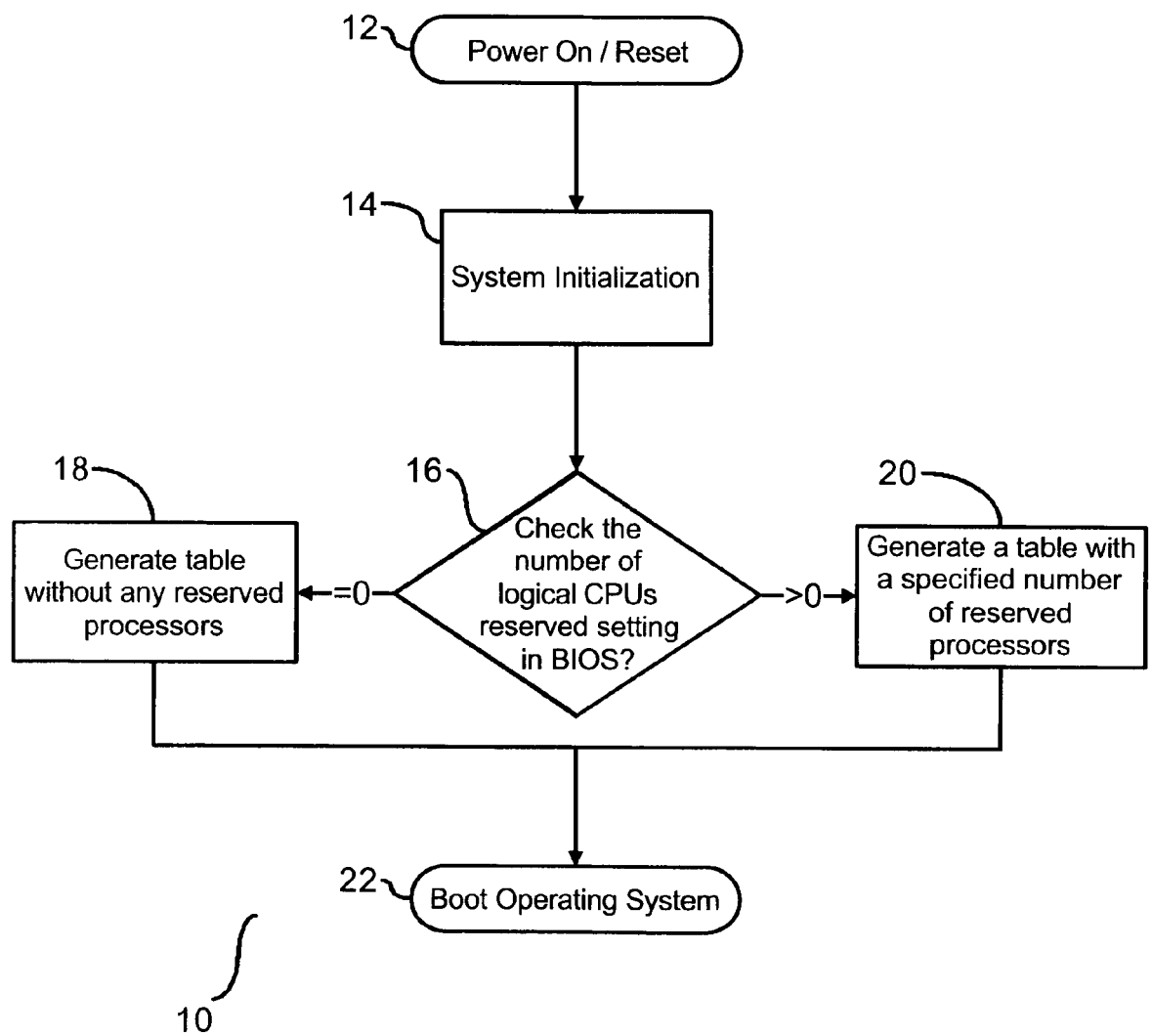
FIG. 1 is a flow chart illustrating a process for initializing an identification table.

A physical processor corresponds to one processor chip. Recent physical processor chips contain multiple processors with each processor in the chip known as a logical processor. FIG. 1 is a flow chart (10) illustrating a process for generating a table to communicate a location of each logical and physical processor to the operating system. Following a power-on of the system or a system reset (12), the computer system is initialized (14). The initialization at step (14) is considered the first initialization step and includes initialization of the BIOS (Basic Input Output System) and hardware of the computer system. Thereafter, a second initialization step is commenced with a test to determine the quantity of logical processors, if any, designated in the BIOS setup in a non-processing state (16). In one embodiment, the non-processing state may be placing the designated processor(s) in an idle state and marking the designated processor(s) in an associated table as disabled. By designating a logical processor as disabled, the logical processor is essentially hidden from the operating system and the customer using an industry standard interface. If the response to the test at step (16) indicates that there are no processors designated in the BIOS setup in a non-processing state, then a table is generated with each of the processors in the system designated as active and available to the operating system for processing (18). However, if the response to the test at step (16) indicates that there is at least one processor designated in the BIOS setup in a non-processing state, then a table is generated identifying each processor and the operational state of each processor (20), i.e. active or disabled. An active designation of a processor indicates the processor is available to the operating system, and a disabled designation of a processor indicates the processor is in an idle state and not available to the operating system. Following the generation of the table at either step (16) or step (18) the system initialization is complete and the operating system may be booted up (22). Accordingly, the system initialization includes generating a table in which each processor in the system is designated as active and available to the operating system or in an idle state and unavailable to the operating system.

Figure 2:
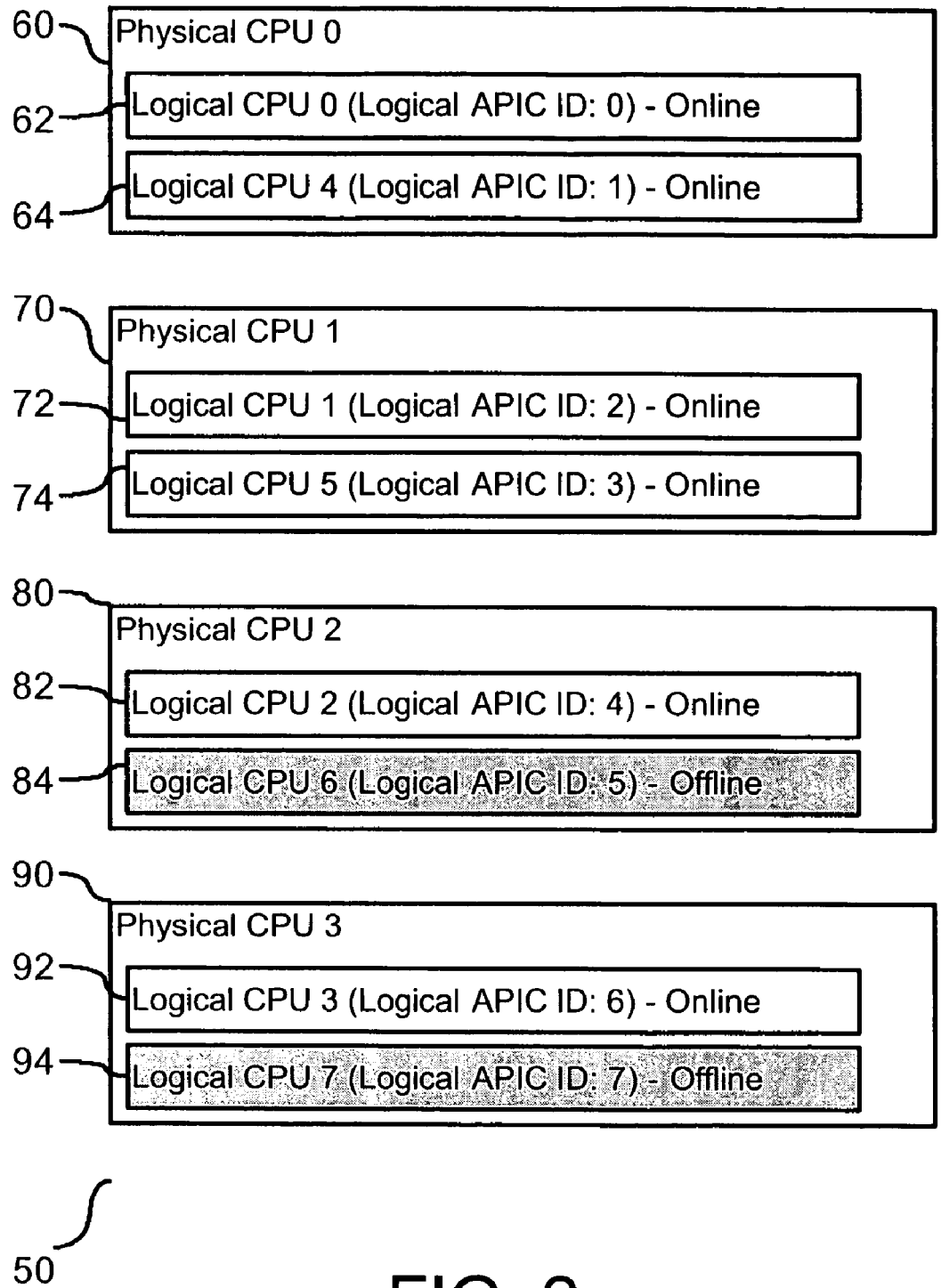
FIG. 2 is a block diagram of a computer system with identification of the status of each processor.

FIG. 2 is a block diagram (50) of a computer system and the designation of the processors in the system. The computer system has four physical processors $CPU_0$ (60), $CPU_1$ (70), $CPU_2$ (80), and $CPU_3$ (90), with each physical processor having two associated logical processors. For example, physical $CPU_0$ (60) has logical $CPU_0$ (62) and logical $CPU_4$ (64), physical $CPU_1$ (70) has logical $CPU_1$ (72) and logical $CPU_5$ (74), physical $CPU_2$ (80) has logical $CPU_2$ (82) and logical $CPU_6$ (84), and physical $CPU_3$ (90) has logical $CPU_3$ (92) and logical $CPU_7$ (94). The BIOS creates a table in the main memory (RAM) during start-up. In one embodiment, the table is identified as an ACPI (Advanced Configuration and Power Interface) MAPIC (Multiple Advanced Programmable Interrupt Controller) table, where this table is a structure used by ACPI to describe interrupt routing in a particular machine to the operating system. This table identifies all processors in the system, including which processors are active and available to the operating system. Each logical processor has an identification number. As shown in FIG. 2, the following processors have the following identification numbers: logical $CPU_0$ (62) has identification number 0, and logical $CPU_4$ (64) has identification number 1, logical $CPU_1$ (72) has identification number 2, logical $CPU_5$ (74) has identification number 3, logical $CPU_2$ (82) has identification number 4, logical $CPU_6$ (84) has identification number 5, logical $CPU_3$ (92) has identification number 6, and logical $CPU_7$ (94) has identification number 7. In addition, each logical processor has an associated flag to indicate whether the processor is enabled or disabled. For example, in one embodiment, a flag value of zero is indicative of the processor being disabled, i.e. idle, and a flag value of one is indicative of the processor being enabled, i.e. active. It should be readily apparent to those skilled in the art that in other advantageous embodiments, a flag value of one may be indicative of the processor being disabled, i.e. idle, and a flag value of zero is indicative of the processor being enabled, i.e. active. As shown, logical $CPU_0$ (62) and logical $CPU_4$ (64) of physical $CPU_0$ (60) are active. Similarly, logical $CPU_1$ (72) and logical $CPU_5$ (74) of physical $CPU_1$ (70) are active, as is logical $CPU_2$ (82) of physical $CPU_2$ (80) and logical $CPU_3$ (92) of physical $CPU_3$ (90). However, logical $CPU_6$ (84) of physical $CPU_2$ (80) and logical $CPU_7$ (94) of physical $CPU_3$ (90) are inactive, i.e. an idle state. In the example shown in FIG. 2, each physical processor has two designated logical processors, some of which are active and some of which are idle. However, it should be readily apparent to those skilled in the art that a physical processor may include more or less than two logical processors. Accordingly, the process of reserving a set quantity of logical processors in the system initialization, provides availability of the logical processor(s) to replace performance of a failed physical or logical processor.

Figure 3:
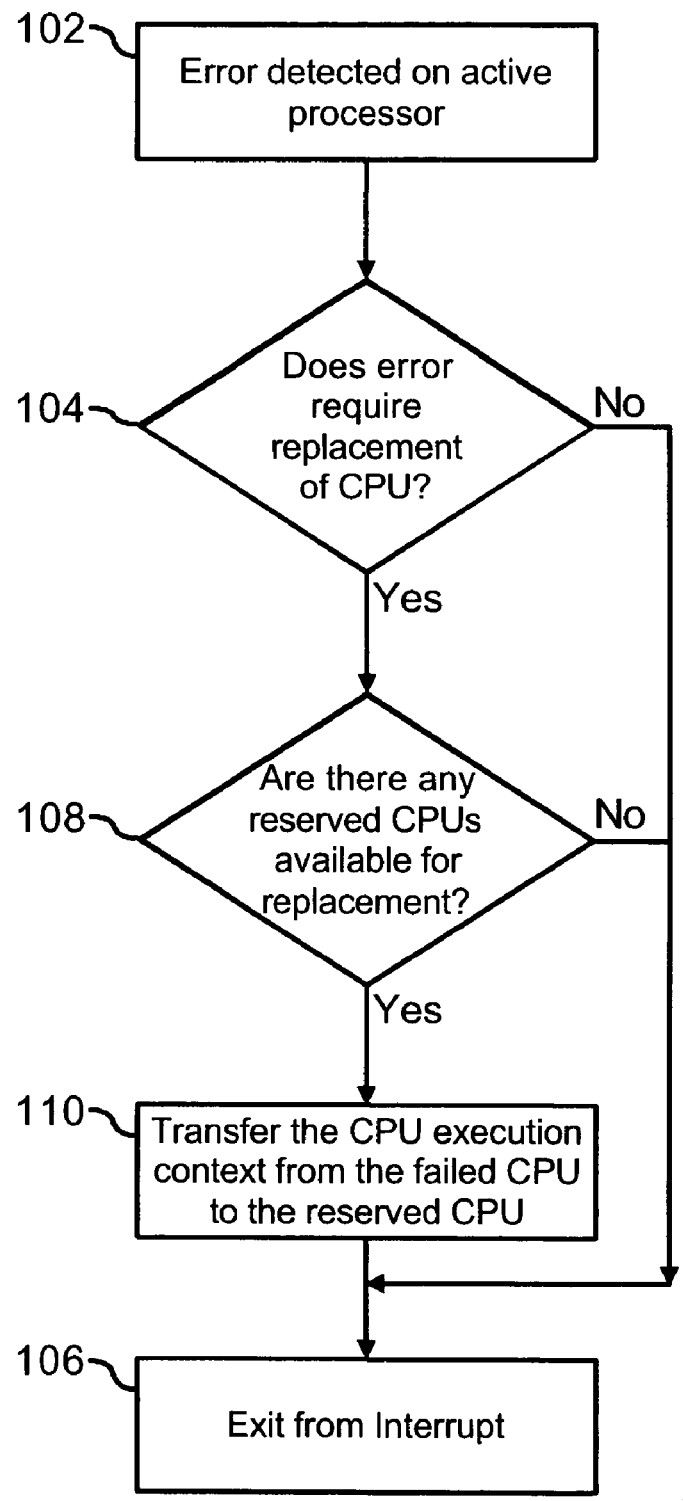
FIG. 3 is flow chart illustrating a process for handling an error in one of the processors, according to the preferred embodiment of this invention, and is suggested for printing on the first page of the issued patent.

In the event an error occurs in one of the active processors, physical or logical, a BIOS Interrupt Handler may be invoked to determine the cause of the error, and if necessary, correct the error. FIG. 3 is a flow chart (100) illustrating a process for invoking a BIOS Interrupt Handler in response to an error in an active processor. Following the boot of the operating system at step (102), an error is detected on an active processor and the BIOS Interrupt Handler becomes activated (102). Thereafter, a test is conducted for the BIOS to determine the cause of the error that activated the BIOS Interrupt Handler and to determine if the error requires replacement of the associated processor (104). If the error found at step (104) is considered minor, the BIOS Interrupt Handler may decided to allow the processor to remain active until a future error occurs. Thereafter, the BIOS Interrupt Handler is exited (106). In one embodiment, the BIOS Interrupt Handler may decided if the error is the first error associated with the processor and determine the status of the processor in response to the decision. An example of an error that would warrant replacement of the active processor includes an ECC single bit error at a critical section of the processor, such as a register file, TLB, and integrated cache memory. However, if the test at step (104) indicates that the error requires replacement of the active processor, a subsequent test is conducted to determine if there are any processors that have been reserved during the system initialization that are available to replace the active processor (108). A negative response to the test at step (108) is an indication that there are no reserved processors available to replace the processor that has experienced the error, and the BIOS Interrupt Handler is exited (106). However, a positive response to the test at step (108) will result in a transfer of the execution context from the active processor that is experiencing the error to at least one of the inactive processors that has been designated to replace the active processor (110). The execution context may include information in the processor registers and other data that supports communication between the processor and the operating system. Accordingly, the BIOS Interrupt Handler determines the necessity of activating an idle processor in response to an error associated with an active processor as well as the availability of an inactive processor and transfer execution context to a reserved processor.

Figure 4A:
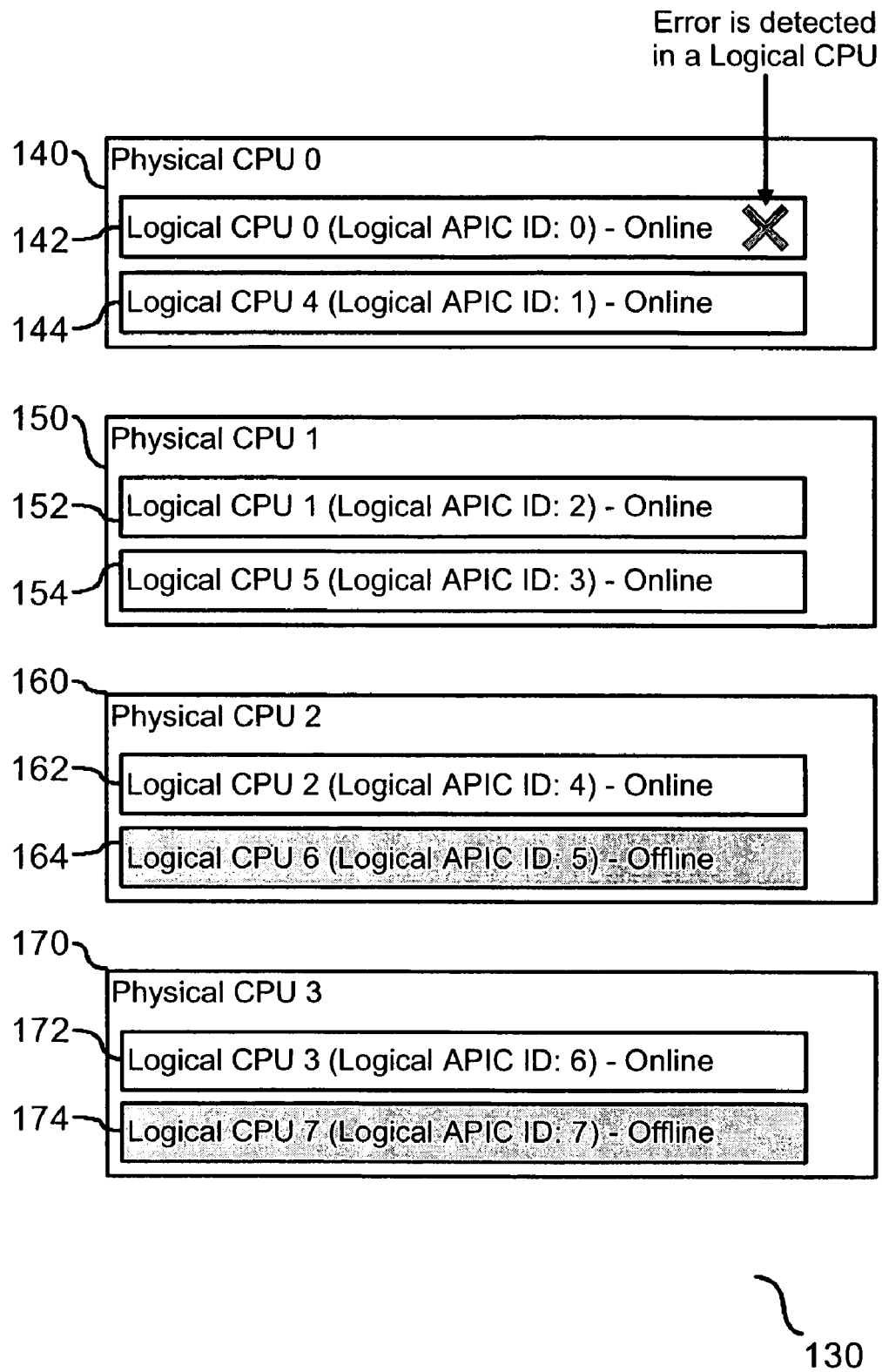
FIG. 4a is a block diagram of the identification and status of each processor prior to occurrence of an error in a logical processor.
Figure 4B:
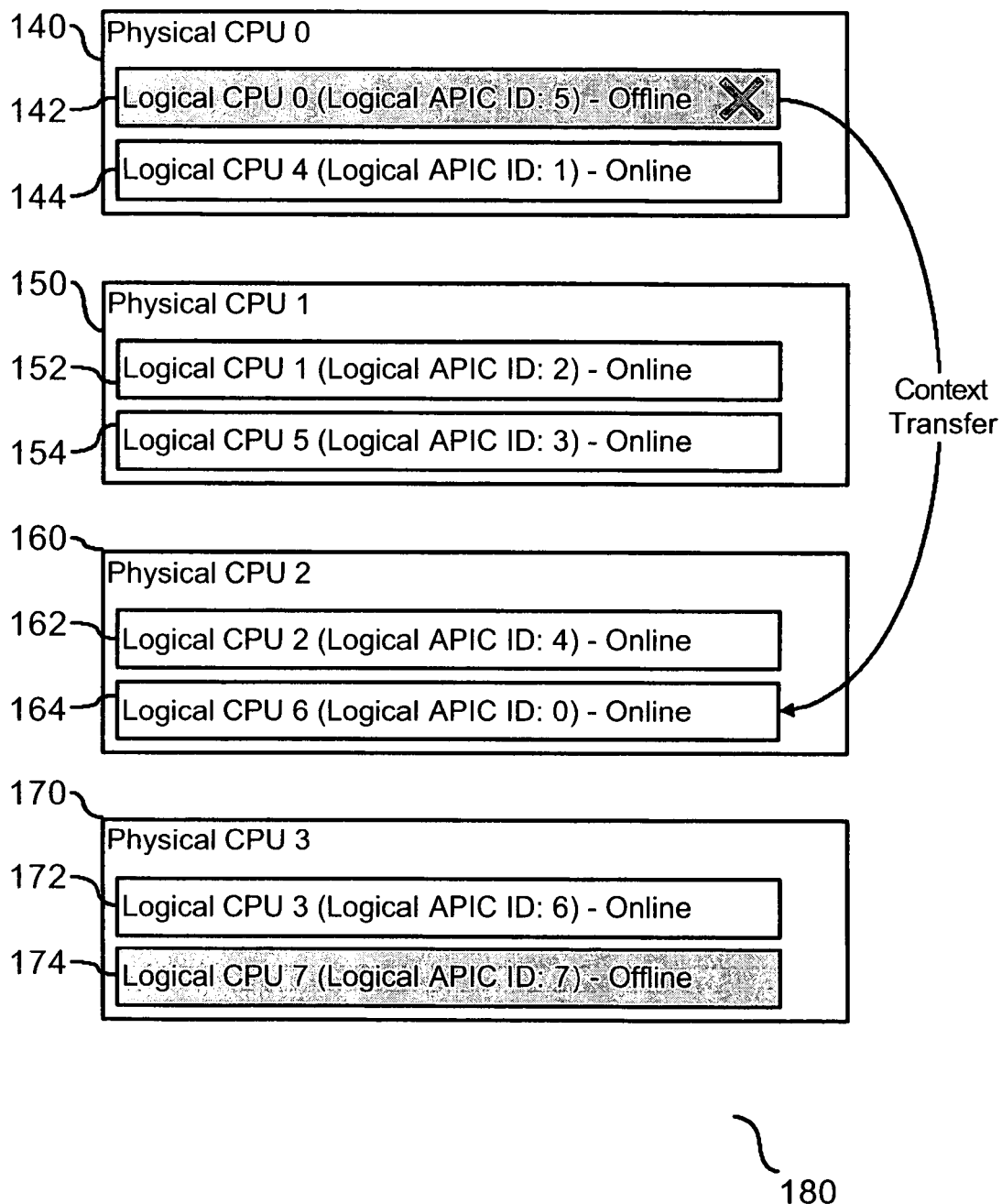
FIG. 4b is a block diagram of the identification and status of each processor following occurrence of an error in a logical processor.

FIG. 4a is a block diagram (130), illustrating the status and identification of each CPU in a system prior to replacement of a logical CPU experiencing an error, and FIG. 4b is a block diagram (180) illustrating the status and identification of each following replacement of the logical CPU experiencing an error. As shown, there are four physical processors $CPU_0$ (140), $CPU_1$ (150), $CPU_2$ (160), and $CPU_3$ (170). Each physical processor has two associated logical processors. Physical $CPU_0$ (140) has logical $CPU_0$ (142) and logical $CPU_4$(144), physical $CPU_1$ (150) has logical $CPU_1$ (152) and logical $CPU_5$ (154), physical $CPU_2$ (160) has logical $CPU_2$ (162) and logical $CPU_6$ (164), and physical $CPU_3$ (170) has logical $CPU_3$ (172) and logical $CPU_7$ (174). As shown in FIG. 4a, an error is detected with logical $CPU_0$ (142). Following detection of the error, logical $CPU_0$ (140) is placed in an idle state, and assigned the identification number of logical $CPU_6$ (164), as shown in FIG. 4b (180). At the same time, logical $CPU_6$ (164) is placed in an active state and assigned the identification number of $CPU_0$ (142). Once a CPU experiences an error and is placed in an idle state, it cannot be reactivated by the BIOS Interrupt Handler. Accordingly, the process of activating a disabled processor and deactivating a processor that has experienced an error includes switching the identification numbers of the processors involved in the transaction.

Figure 5A:
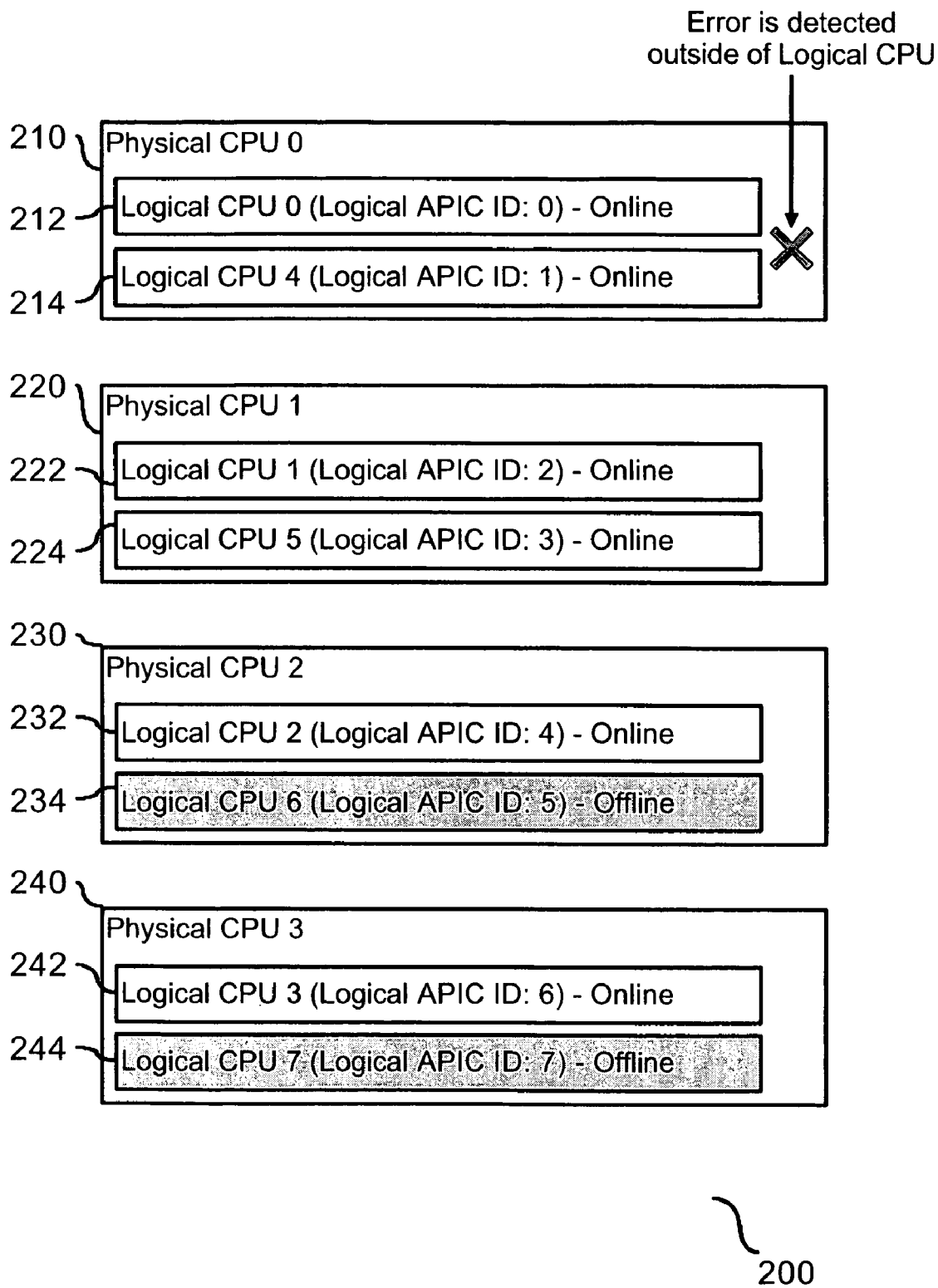
FIG. 5a is a block diagram of the identification and status of each processor prior to occurrence of an error in a physical processor.
Figure 5B:
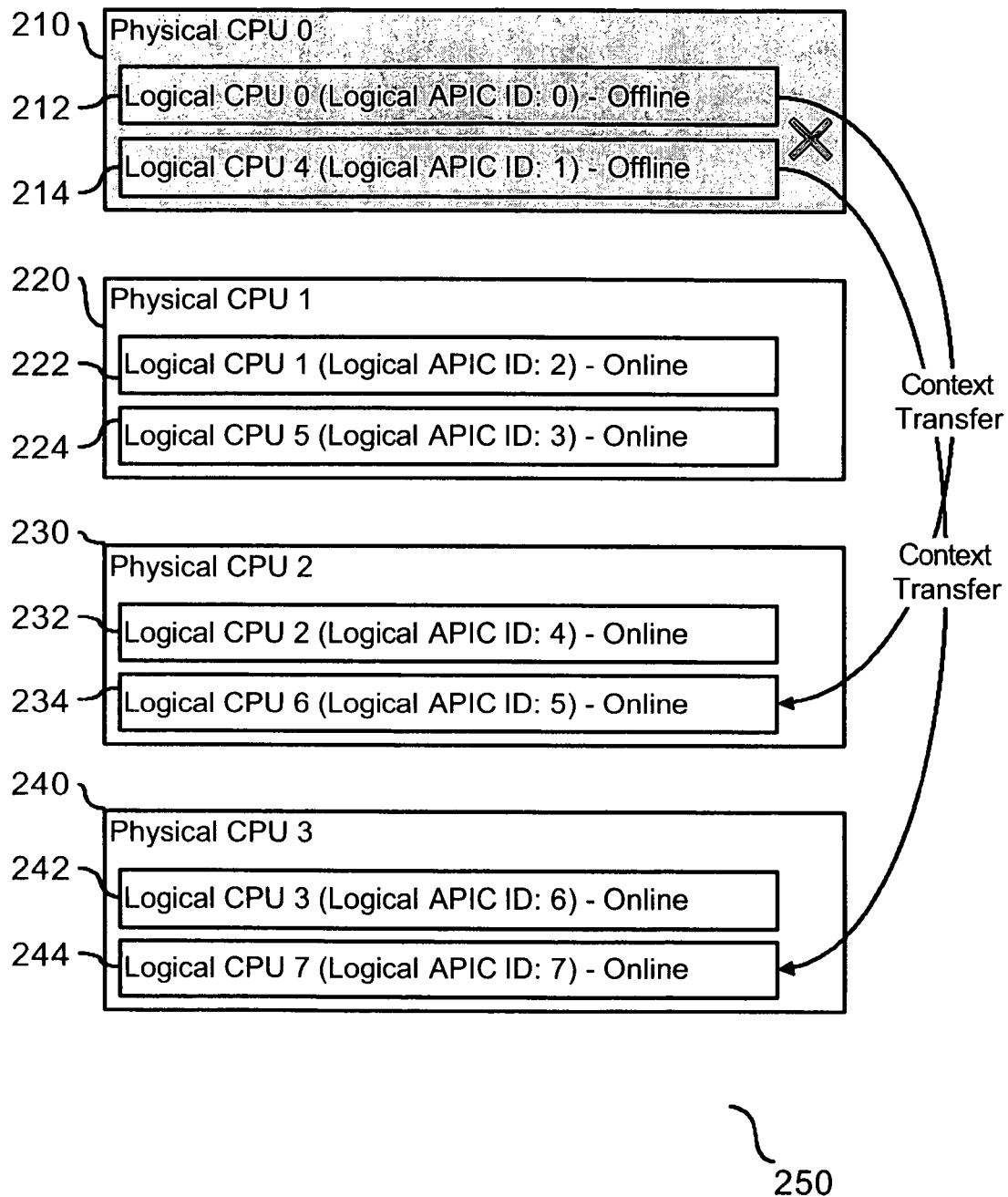
FIG. 5b is a block diagram of the identification and status of each processor following occurrence of an error in a physical processor.

In addition to detecting an error in a logical processor and replacing the logical processor experiencing the error with another logical processor, an error may also be detected outside of a logical processor. FIG. 5a is a block diagram (200), illustrating the status and identification of each CPU in a system prior to experienced an error associated with one of the physical processors, and FIG. 5b is a block diagram (250) illustrating the status and identification of each CPU in a system following one of the physical processors experiencing an error. As shown, an error is detected in a physical processor, i.e. physical $CPU_0$ (210), which is shared by multiple logical processors. There are four physical processors $CPU_0$ (210), $CPU_1$ (220), $CPU_2$ (230), and $CPU_3$ (240). Each physical processor has two associated logical processors. Physical $CPU_0$ (210) has logical $CPU_0$ (212) and logical $CPU_4$ (214), physical $CPU_1$ (220) has logical $CPU_1$ (222) and logical $CPU_1$ (224), physical $CPU_2$ (230) has logical $CPU_2$ (232) and logical $CPU_6$ (234), and physical $CPU_3$ (240) has logical $CPU_3$ (242) and logical $CPU_7$ (244). In a first state, Logical $CPU_0$ (212) is shown in FIG. 5a with an identification number of 0 and active, and logical $CPU_4$ (214) is shown with an identification number of 1 and active. Similarly, in a first state, logical $CPU_6$ (234) has an identification number of 5 and idle, and logical $CPU_7$ (244) has an identification number of 7 and idle, as shown in FIG. 5a. In response to an error detected as part of physical $CPU_0$ (210), the BIOS Interrupt Handler determines the cause of the error is outside of the logical processors and replaces all logical CPUs affected by the error in the associated physical processor, i.e. $CPU_0$ (210). As shown in FIG. 5b (250), logical $CPU_6$ (234) is placed in an active state and assigned the identification number of logical $CPU_0$ (212). Similarly, logical $CPU_8$ (244) is placed in an active state and assigned the identification number of logical $CPU_1$ (214). At the same time, logical $CPU_0$ (212) is placed in an idle state and assigned the identification number of logical $CPU_6$ (234), and logical $CPU_1$ (214) is placed in an idle state and assigned the identification number of $CPU_7$ (244). Accordingly, when an error is detected in the physical processor, the BIOS Interrupt Handler replaces the logical processors shared by the physical processor.

Advantages Over the Prior Art

The method and system for providing availability of a reserved processor in the event of failure of an active processor does not require additional hardware to the computer system or modification to the operating system. The computer system may automatically reserve a preselected quantity of processor in an inactive state, or it may allow an operator to designate a specific quantity of processors as inactive. In either scenario, a table is generated to identify to the operating system the status and location of each processor in the system. In response to an error in an active processor, the execution context of the active processor may be transferred to an identified inactive processor, followed by activation of the processor that has received the execution context. The method and system disclosed herein provides high availability of processors without requiring hardware redundancy, such as memory and disk mirroring, and I/O. Accordingly, high availability is provided without requiring additional hardware elements.

Alternative Embodiments

It will be appreciated that, although specific embodiments of the invention have been described herein for purposes of illustration, various modifications may be made without departing from the spirit and scope of the invention. In particular, a table is created to identify the location and status of each processor to the operating system. The table may be an ACPI MAPIC table, an MPS (Multiprocessor Specification) table, or an alternative table that enables communication and identification of each processor to the operating system. In addition, the BIOS may be modified to prompt an operator to designate the number of processors to be placed in an idle state. The BIOS setup would limit the quantity of reserved processors to the total quantity of logical processors in the system less one. Finally, when a processor experiences a non-fatal error, the error may be placed in the system log to inform the operator of the error at a later time. Similarly, when a processor experiences a fatal error, i.e. an error that requires reassignment to a reserved processor, a message may be sent to the operator indicating that the processor which has experienced the error needs correction and/or replacement. Accordingly, the scope of protection of this invention is limited only by the following claims and their equivalents.

I claim:

1. A method for use in a multiprocessor system comprising:
configuring said multiprocessor system with a first physical processor and a second physical processor, said first physical processor having an embedded logical processor, and said second physical processor having an embedded logical processor;
placing at least one of said logical processors in an active state and reserving at least one of said logical processors in an inactive state;
determining availability of at least one of said reserved logical processors in response to an error in at least one of said active processors;
activating at least one of said reserved logical processors determined to be available; and
detecting an error in one of said physical processors and replacing each logical processor embedded in said error detected physical processor with an available reserved logical processor of a non-failed physical processor.

2. The method of claim 1, wherein the step of reserving said logical processor in an inactive state includes marking said reserved logical processor as disabled in a table.

3. The method of claim 2, wherein said table is selected from a group consisting of: an ACPI MAPIC table, and a MPS table.

4. The method of claim 1, wherein the step of replacing said processor includes transferring execution context from said processor with said error to said activated logical processor.

5. The method of claim 4, further comprising invoking a BIOS interrupt handler to facilitate transfer of execution context to said first processor.

6. The method of claim 1, further comprising transferring execution context of each logical processor associated with an error detected physical processor to said replaced logical processor.

* * * * *